Patented July 22, 1947

2,424,383

UNITED STATES PATENT OFFICE 2,424,383

PHENOL-FORMALDEHYDE-PROTEIN PLASTIC MATERIALS FOR EXTRUSION OR INJECTION

Francis E. Calvert, Cincinnati, Ohio, assignor to The Drackett Company, Cincinnati, Ohio, a corporation of Ohio No Drawing. Application September 2, 1944, Serial No. 552,568

3 Claims. (Cl. 260—7)

This invention relates to a thermosetting plastic material capable of conversion to insoluble and infusible form by heating at relatively low temperatures, and useful in extrusion or injection processes, and to a method of making the same.

Thermoplastic materials, such as the cellulose acetates, vinyls, styrenes, and acrylates, have been extruded into various shapes as standard commercial practice for many years. While such thermoplastic materials have many excellent properties, they are found to lack heat stability. This defect precludes their use in many fields, since serious warping and distortion occur in the temperature range of 180 to 200° F. Milk casein, and, more recently, soybean protein have been extruded into rods, principally in the button industry, the rods being machined into buttons which are then immersed in formaldehyde solution for from ten to twenty days to improve their resistance to water. Unfortunately, the formaldehyde hardened buttons have only fair water resistance and are therefore limited in their field of use, and because of this lack of water resistance, the casein button industry is the only large volume outlet for casein plastics.

In accordance with the present invention it is proposed to produce a plastic material having the advantages of prior materials capable of extrusion, together with certain further advantages, and which avoids the serious defects characterizing the plastics of the prior art. Thus, the extrusion and injection plastic hereinafter described is definitely stable to heat and combines the extrusion properties of a thermoplastic with the heat stability of a thermosetting material. It is characterized by high water resistance and may be hardened very simply by heating for short periods at relatively low temperatures, for example below 100° C. The strength of the new material both in tension and in resistance to flexure, is excellent, it may be extruded readily on standard extrusion machines, and the extruded bars or rods are easily machined into the desired shape.

These and other desirable characteristics are obtained by reacting a proteinaceous material, for example soybean protein, which is soluble in mild alkaline solution, with a slightly acid hydrophilic phenolic resin of the casting type. Such resins are well known and are described in the literature, for example in Handbook of Plastics by Simonds, Ellis, and Bigelow (D. Van Nostrand 1943), pages 476–480, and Plastics Catalog 1943, pages 94, 95, 96, 101. The reaction is conducted in the presence of sufficient water to insure in the final product an amount of water ranging from about 6 to about 18%, and more preferably, from 10 to 15%, the presence of water within the stated ranges being of the utmost importance where maximum strength is essential.

Following extrustion of the product, the extruded piece can readily be converted to the infusible form by low temperature heating for relatively short periods as hereinbefore indicated.

It is accordingly an object of the invention to produce a thermosetting plastic for use in extrusion and injection processes, such plastic comprising the reaction product of a hydrophilic casting type phenolic resin and a protein (the term including casein) soluble in mild alkali, water content of the product being so regulated as to fall within the limits hereinbefore recited.

Further objects and features of the invention will be apparent from the following description, it being understood that the scope of the invention is not intended to be limited except to the extent indicated in the accompanying claims, details of the process and product being included herein merely to facilitate an understanding of the principles underlying the invention.

The phenolic resin employed in the preparation of my improved plastic material may vary considerably in its constitution and properties, and the method by which the resin is made forms no essential part of the present invention, except to the extent that it affects the subsequent reaction of the resin with the protein. I employ a resin of the type known as a casting resin which is invariably unsuitable for extrusion operations of a continuous nature. Such a resin may be produced by the following process or an equivalent casting type resin.

A mixture of 875 grams of 40% formaldehyde, 500 grams of phenol, and 10 grams of sodium hydroxide is reacted at 190° F. for forty-five to fifty minutes. The reaction product is immediately neutralized with lactic or hydroxy acetic acid, and rendered slightly acid. At this point a small amount of glycerine or polyhydric alcohol may be added as a plasticizer.

The resin thus prepared is placed in a heavy duty mixer and 500 to 750 grams of soybean protein or milk casein are added. The whole mass is then thoroughly mixed and is dewatered under vacuum simultaneously to a moisture content of from 10 to 15%. The time required to bring the mixture to the desired moisture content will vary with the nature of the reaction materials and particularly with the type of protein employed, and samples of the mixture are taken at intervals to ascertain the moisture content.

If soybean protein isolated as described in the application of Gangloff et al., Serial Number 445,666, filed June 3, 1942, is employed, and the reaction is carried out at a pressure of twenty-five inches of mercury, a moisture content of from 10 to 15% may be reached in about ninety minutes. The resulting mass is plastic and is reduced by any convenient means to particles of from one-eighth to one-quarter inch for use in an extrusion machine in a conventional manner. After extrusion, the material is then converted to infusible form by heating in an oven at a temperature below 100° C. for from ten to seventy-two hours.

It will be appreciated that many details in the foregoing example may be substantially modified without seriously affecting the characteristics of the product. For example, the amount of formaldehyde used in the preparation of the resin may be varied from 400 to 2000 grams and the sodium hydroxide may be varied from 2 to 20 grams, or other basic catalysts may be substituted therefor. The amount of protein is not substantially less than 50% and is not substantially greater than 150% by weight of the amount of phenol in the resin. The acids named herein are not essential to successful practice of the invention; numerous organic and inorganic acids may be employed. For example, I may use such widely differing acids as tartaric, citric, lactic, hydroxy acetic, trichloracetic, phosphoric, sulfuric, or hydrochloric. The use of strong oxidizing acids such as nitric or chromic should be avoided. In lieu of phenol, its homologues commonly used in the preparation of resins, such as meta para cresol or resin cresol, may be employed, it being understood that the term "phenol formaldehyde resin" as employed herein is intended to include within its scope these and other equivalent resins, provided the materials employed and the reaction conditions are such as to insure the formation of a hydrophilic casting type phenolic resin.

The time of reaction and the temperature employed in the formation of the resin may be widely varied; each lowering of temperature by a 20° F. interval approximately doubles the reaction time in the example referred to hereinbefore, other factors remaining the same. Commercial casting type phenolics constitute a well recognized class and their use for the reaction with the proteinaceous material in the practice of the present invention is contemplated. As regards the proteinaceous material, the use of vegetable and animal proteins such as are dispersible in mild alkaline solutions is contemplated; these include globulins (edestin, glycinin, etc.) and milk casein. Isolated soybean protein, prepared as described in the aforesaid application of Gangloff et al., gives especially good results.

My plastic material requires no pressure in the curing or hardening process, and may be hardened at low temperatures. A temperature below 100° C. is desirable in order to avoid blistering and porosity, and the curing temperature is preferably not less than 60° C., since material which hardens at a less temperature is likely to cure during the extrusion step. If desired, the curing temperature and time may be reduced by increasing the acid content of the resin, or additional acid may be introduced in the mass at any time before curing. Acidulation of the resin prior to reaction with the protein is important, and the total amount of acid employed is preferably such that the pH value of the reaction mixture is not below 3 nor above 6; the pH of between 4.5 and 5 is preferred.

As hereinbefore indicated, the moisture content is fairly critical. Plastic material otherwise prepared in accordance with the invention but having a moisture content of less than 5% lacks adequate strength and is brittle; if the moisture content is above 18%, the material does not cure properly and tends to be rubbery. It may also be noted that water cannot be added after the reaction since such water is not tenaciously held and is not retained. The water contained in the resin and proteinaceous material, when reduced to the proper percentage during the reaction as hereinbefore described, is held colloidally and permanently in the plastic material.

In the practice of my invention, the proteinaceous material apparently goes into colloidal solution in the slightly acid phenolic resin; the resulting plastic is quite homogeneous and is characterized by unusually high strength. It may be extruded without fear of pre-curing, thus allowing a full manipulation during processing. This is an important feature since standard phenolics which are basis catalyzed cannot be used in the usual extrusion machines because they cure during the extrusion process. Special phenolic resins which cure sufficiently slowly to permit satisfactory extrusion cannot be hardened except under heat and pressure which requires expensive pressure equipment, since blistering and porous structure results in the absence of external pressure. The standard casting resins are fluids incapable of being extruded because of their physical form and are therefore not adapted for extrusion or injection molding. It will therefore be appreciated that my plastic material produced by the reaction of the protein and slightly acidic phenolic resin, and containing a small percentage of water, presents characteristics which are especially adapted to the extrusion and injection field, and exhibits properties which are in general far superior to those of prior plastic materials.

Having thus described the invention what is claimed as new and desired to be secured by Letters Patent is:

1. In a method for producing a thermosetting plastic suitable for use in continuous extrusion or injection processes and capable of hardening to an insoluble and infusible form by low temperature heating and without pressure, the steps which comprise heating a mixture of 500 parts of a compound selected from the group consisting of phenol and cresols, from 400 to 2,000 parts of 40% formaldehyde, and a basic catalyst in amount equivalent to from 2 to 20 parts of sodium hydroxide, to form a water soluble castable condensation resin, acidulating the resin to a pH value of from 3.0 to 6.0 to form a water soluble product, and mixing with the acidulated resin from 500 to 750 parts of a protein dispersible in mild alkaline solution while dewatering the mixture to a colloidally held moisture content of from 6 to 18%.

2. A method for producing a thermosetting plastic as recited in claim 1, in which the protein is soybean protein and in which the mixture of acidulated resin and protein is dewatered to a colloidally held moisture content of from 10 to 15%.

3. A thermosetting plastic suitable for use in continuous extrusion or injection processes and capable of hardening to an insoluble and infusible form by low temperature heating and without pressure, said plastic being produced by the method of claim 1.

FRANCIS E. CALVERT.

REFERENCES CITED

The following references are of record in the file of this patent:

UNITED STATES PATENTS

| Number | Name | Date |
|---|---|---|
| 2,129,749 | Sargent | Sept. 13, 1938 |
| 2,053,850 | Sturken | Sept. 8, 1936 |
| 2,066,857 | Rozema | Jan. 5, 1937 |
| 2,262,422 | Brother | Nov. 11, 1941 |
| Re. 19,708 | Ostersetzer | Sept. 17, 1935 |
| 2,373,401 | King | Apr. 10, 1945 |

FOREIGN PATENTS

| Number | Country | Date |
|---|---|---|
| 379,739 | Great Britain | Sept. 5, 1932 |

OTHER REFERENCES

McKinney et al., Ind. & Eng. Chem. vol. 35, No. 8, 1943, pages 905 to 908.